United States Patent
Berger et al.

[11] 3,805,689
[45] Apr. 23, 1974

[54] AUTOMATIC HOOP FILLING UNIT

[75] Inventors: Thomas C. Berger, Two Rivers; Fred A. Loichinger, Manitowoc, both of Wis.

[73] Assignee: Stoelting Brothers Company, Kiel, Wis.

[22] Filed: Sept. 27, 1971

[21] Appl. No.: 183,858

[52] U.S. Cl.................... 99/461, 99/484, 100/215, 99/485, 141/80, 141/83
[51] Int. Cl.... A23c 19/02, A47j 44/02, B65b 63/02
[58] Field of Search............. 141/73, 80, 83; 31/46; 99/243, 452, 460.1, 484, 485; 100/215

[56] References Cited
UNITED STATES PATENTS

| | | | |
|---|---|---|---|
| 3,721,060 | 3/1973 | Quinto | 100/215 X |
| 3,481,268 | 12/1969 | Price | 100/215 X |
| 3,563,168 | 2/1971 | Doninger | 100/215 |
| 2,875,590 | 3/1959 | Girton | 99/460 X |
| 3,355,805 | 12/1967 | Krueger | 31/46 |
| 3,449,127 | 6/1969 | Budahn | 31/46 X |
| 3,662,464 | 5/1972 | Peters | 31/46 |
| 3,152,622 | 10/1964 | Rothermel | 141/83 |
| 3,215,173 | 11/1965 | Rutherford | 141/83 |
| 2,850,047 | 9/1958 | Gold | 141/80 |
| 3,404,009 | 10/1968 | Lambert | 31/46 X |
| 3,615,587 | 10/1971 | Koopmans | 99/243 X |
| 3,636,630 | 1/1972 | Budahn | 31/46 X |
| 3,648,741 | 3/1972 | Croasdale | 141/83 X |

*Primary Examiner*—Wayne A. Morse, Jr.

[57] ABSTRACT

A hoop filling unit has four stations, load, fill, press, and unload stations, and a rotatable turntable for moving a hoop sequentially through the four stations. The turntable includes four hoop carriers and is driven in a step-by-step manner to position a carrier sequentially at each of the four stations. A conveyor arrangement is associated with the load and unload stations and includes an automatic mechanism for moving an empty hoop onto a carrier plate at the load station and removing a filled hoop from a carrier plate at the unload station. A guide chute is positioned above each of the carrier plates and is connected for rotation with the turntable. The guide chutes are connected for vertical movement relative to the turntable and engage the upper edge of a hoop at both the fill and press stations, at the load and unload stations the guide chutes are raised to provide clearance for movement of the hoops onto and off of the turntable. Curd is delivered to the fill station where is it weighed and, when a predetermined weight of curd has been accumulated, it is discharged through the guide chute into a hoop positioned at the fill station. The just filled hoop is transferred to the press station where a pad is moved downwardly through the guide chute into the filled hoop to a level below the upper edge of the hoop. The guide chutes are supported from an enlarged diameter section of the drive shaft by four-bar linkages and each includes a raising and lowering mechanism which rides on an annular track having a raised portion and a lower portion to thereby lower the guide chutes at the fill and press stations and raise them at the load and unload stations. An indexing mechanism is provided to position the turntable and hoop carriers at each of the four stations and to lock the turntable in such positions when so located.

10 Claims, 7 Drawing Figures

3,805,689
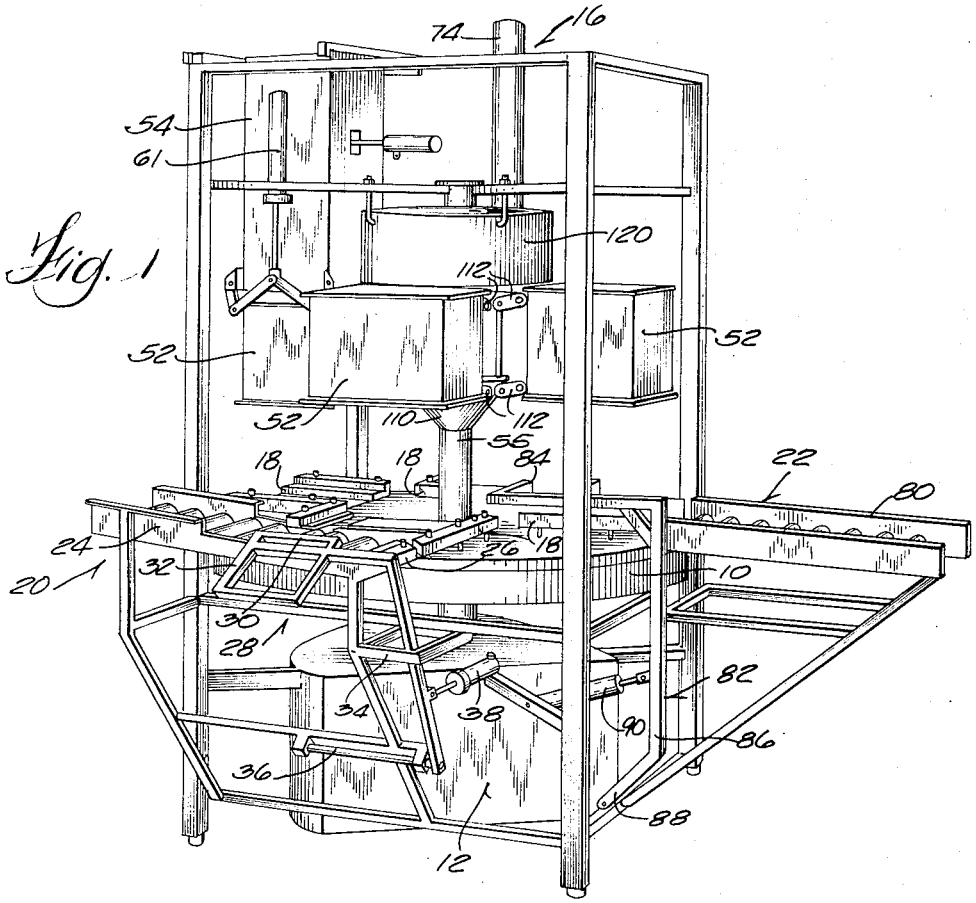
Fig. 1
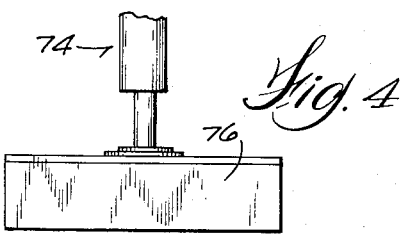
Fig. 4
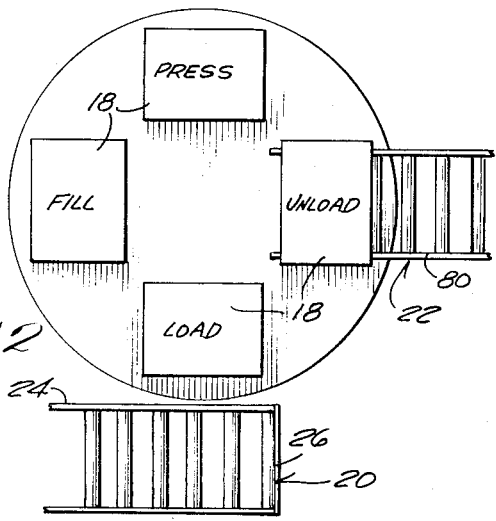
Fig. 2
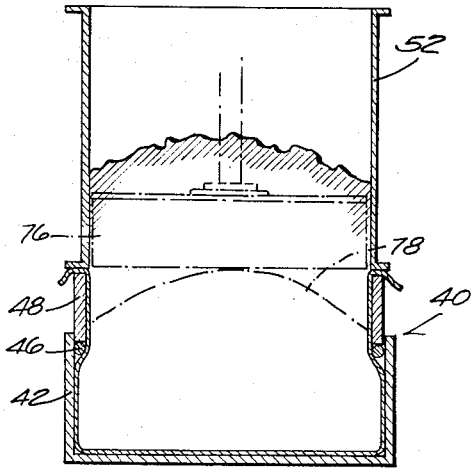

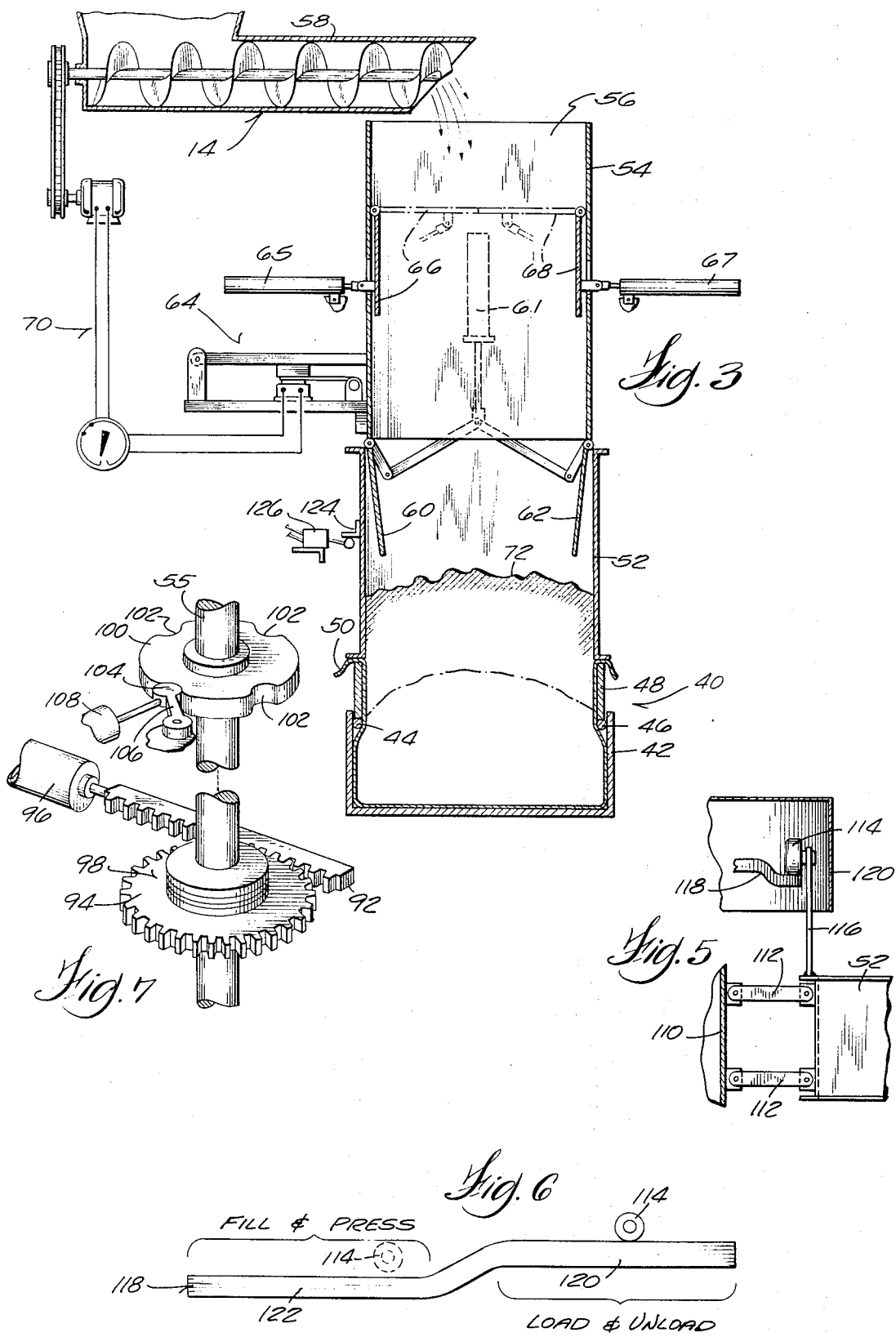

3,805,689

AUTOMATIC HOOP FILLING UNIT

BACKGROUND OF THE INVENTION

This invention relates to cheese processing machinery.

In the processing of block cheese it is necessary to fill the cheese into a suitable form. For example, in the processing of cheddar cheese, chunks of curd are filled into a hoop, the hoop being a basically rectangular open ended box. Being fed into the loop in chunks, there is a considerable amount of air in the filled hoop and it is necessary to compress the chunks to produce the final block cheddar. The chunk curd, however, has a particular springy characteristic and when compressed tends to spring back. Generally, hoop filling has been manual operation with some efforts having been made in the past to automate the operation. Manual filling is time consuming and costly, and prior attempts at automating the filling process have been neither satisfactory nor complete from the standpoint of filling and handling of the hoop.

SUMMARY OF THE INVENTION

Among the general objects of this invention are to provide a completely automated unit for filling a hoop with a preselected amount of curd and to do so in an efficient, low cost and reliable manner.

For the achievement of these and other objects, a cheese hoop filler is provided which includes a filling station and a press station. The unit includes a conveying mechanism for transferring a hoop into and out of the filling station and from the filling station to the press station. The unit is provided with a plurality of guide chutes, generally equal in number to the number of stations in the unit, and the guide chutes are mounted for movement with a hoop as the latter is moved by the conveying mechanism so that the guide chutes operate to guide curd from the filling mechanism into the hoop and also hold the filled curd in place until it has been compressed to a desired level at the press station. The guide chutes are also mounted for movement relative to the hoops so that they can be moved into engagement with the hoops to act in the nature of extensions thereof for the purposes discussed above or can be moved away from the hoop to provide clearance for moving a given hoop into or out of the unit.

Preferably, the fill station includes a mechanism for weighing and automatically discharging the curd into the hoop when a predetermined amount of curd has been accumulated. Also, the conveying means is preferably in the form of a rotatable turntable including load and unload stations in addition to the press and fill stations, the load and unload stations each being associated with a conveyor for moving a hoop onto and off of the turntable in the processing cycle. The turntable is preferably driven in a step-by-step fashion to sequentially position a hoop at each of the four stations and includes an indexing mechanism for accurately establishing the position of the turntable and correspondingly the hoop, in particular stations and for locking the turntable in that position once assumed.

Other objects and advantages will be pointed out in, or be apparent from, the specification and claims, as will obvious modifications of the single embodiment shown in the drawings in which:

FIG. 1 is a perspective view of a filling unit embodying this invention;

FIG. 2 is a top plan view of the turntable, hoop carriers, and load and unload conveyors;

FIG. 3 is a section view of the fill station and includes a showing of a curd delivery conveyor;

FIG. 4 is a section view of the press station;

FIG. 5 is a partial section view of the mechanism for raising and lowering the guide chutes;

FIG. 6 illustrates the track of the raising and lowering mechanism in developed form; and FIG. 7 illustrates a portion of mechanism for rotating the turntable.

DESCRIPTION OF THE PREFERRED EMBODIMENT

With reference to FIGS. 1 and 3, a hoop filling unit is illustrated and includes a rotatable turntable 10, a drive for that turntable located in closed housing 12 below the turntable, a curd delivery and fill arrangement 14, and a press arrangement 16. As perhaps is best illustrated, in FIG. 2, and partially visible in FIG. 1, four carrier plates 18 are connected to and rotate with turntable 10 and are spaced 90° from each other. The turntable is associated with a load conveyor 20 and an unload conveyor 22.

Load conveyor 20 has an inclined roller track 24 extending to a hoop stop 26. A hoop can be placed on track 24 and will roll down until it engages stop 26. A push arm assembly 28 is associated with conveyor 20, the push arm assembly including a bumper 30 which is part of bracket 32 which is in turn connected through arm assembly 34 to a pivot shaft 36. A pneumatic cylinder 38 is connected to arm assembly 34 and operation of ram 38 pivots the push arm assembly about shaft 36 to engage a hoop positioned on conveyor 20 and, through bumper 30, push the hoop onto the carrier plate 18 which is located adjacent to conveyor 20. This area associated with conveyor 20 will be referred to hereinafter as the load station of the curd filler unit.

Reference will now be made to FIG. 3 where the basic construction of the hoop assembly will be described. Each hoop assembly 40 includes a generally rectangular open ended box 42. Two transverse pins 44 and 46 extend between opposed walls of Box 42 and a hollow, generally rectangular hoop extension 48 rests on pins 44 and 46 and has a relatively close but sliding fit with the walls of box 42. Pins 44 and 46 are inserted manually in box 42 and at a subsequent point in the process will be extracted manually to permit extension 48 to retract into box 42, this will also be described more completely hereinafter. Also, before moving the hoop assembly onto turntable 10, a cloth liner 50 in the form of an open ended bag, is laid in the hoop (see FIG. 3).

The filler unit also includes a plurality of guide chutes 52 equal in number to the number of carrier plates 18, in this instance four such guide chutes are provided and are spaced apart 90° with one positioned above each of the carrier plates. The guide chutes are generally rectangular in shape and are open at both ends. The function of the guide chutes is to act as a further extension of the hoop assembly by engaging the upper edge of extension 48. The guide chutes are connected to shaft 55 so that they rotate jointly with turntable 10. The guide chutes are also capable of vertical movement so that at the load station they are spaced above the hoop assembly to give adequate clearance for movement of the hoop assembly onto carrier plate 18. As the hoop assembly moves from the load station to the fill station, guide chute 52 is lowered into engagement with the upper edge of extension 48 and remains in engagement with the upper edge of the extension while the hoop assembly is positioned at both the fill station and the press station.

The fill station includes an elongated hopper 54 having an open end 56 which communicates with an auger assembly 58. The auger assembly transports curd in chunk form to hopper 54. Hopper 54 has a pair of doors 60 and 62 at its lower end. The doors 60 and 62 are held closed to accumulate curd within hopper 54. Hopper 54 is also connected to a curd weighing assembly 64 which senses the weight of the curd within the hopper and when the curd reaches a predetermined weight, actuates pneumatic cylinder 61 to open doors 60 and 62 for discharge through chute guide 52 into hoop assembly 40. Hopper 54 includes a second pair of doors 66 and 68 which are closed by pneumatic cylinders 65 and 67 when doors 60 and 62 are opened to thereby prevent curd beyond that already stored in the hopper being discharged into the hoop assembly.

Preferably, auger 58 has a variable speed drive 70 which is controlled by weighing assembly 64 in a manner such that as the amount of curd in the hopper approaches the prescribed weight, the auger speed is reduced so that a dribble feed occurs as the weight approaches the prescribed limit. This dribble feed at the end insures more precise measurement of the curd to be introduced into the hoop assembly.

Because the curd is delivered to the hoop assembly in chunk form and thus will result in a large amount of air spaces being present, the amount of curd initially introduced into the hoop assembly is such that the level will extend up into chute guide 52, i.e. level 72. In the processing of the cheddar cheese the curd is ultimately compressed to a level within box 42 but this is done externally of the filler unit illustrated and described herein. This is done because of the springy nature of the curd which requires not only compression of the curd into the confines of box 42 but holding the curd in that manner for a length of time such that the curd will set sufficiently to prevent spring-back.

The filler unit of this invention includes a press station which is effective to provide an initial press operation on the just filled curd which is sufficient to permit extraction of the filled hoop assembly from the unit. More specifically, the press station includes a pneumatic cylinder 74 having a pressure pad 76 attached to the end thereof. Pressure pad 76 has a shape which conforms generally to the configuration of chute guide 52 and hoop assembly 40, i.e. in this instance the pressure pad is rectangular. The filled hoop with chute guide 52 still engaging the upper edge thereof, is transported by turntable 10 to the press station. At the press station, chute guide 52 is positioned directly below pad 76 and, when so positioned, pneumatic cylinder 74 is operated to drive pad 76 through chute guide 52 into hoop extension 48 to a point below the upper edge of the hoop extension, i.e. curd level 78 in FIGS. 3 and 4. The pressure pad is held in this position for a period of time to allow the curd to remain relatively permanently at level 78 or at least to minimize the amount of springback such that the curd level will not rise above the upper edge of hoop extension 48. Pressure pad 76 is then retracted from chute guide 52 and the hoop assembly with hoop guide 52 is moved to the unload station. In moving from the press station to the unload station, hoop guide 52 is raised a sufficient distance to permit clearance for retraction of the hoop assembly at the unload station.

Conveyor 22 is located at the unload station. Conveyor 22 includes an inclined roller track 80 and a pivotal arm assembly 82. Arm assembly 82 includes an L-shaped end 84 which extends over turntable 10 and a vertical arm 86 which extends down to a pivot axis 88. Pneumatic cylinder 90 is connected to arm 86 and is effective to pivot arm 86 clockwise to engage arm 84 with a hoop assembly on carrier plate 18 located at the unload station and move that hoop assembly onto roller track 80 whereupon it can be removed from the filler unit.

As can be seen from the description of the unit to this point, hoops are automatically filled and a preliminary compression is made of the filled curd in an automated manner. The hoop assembly thus processed, is removed to a separate area where the operator removes transverse pins 44 and 46 manually. The hoop assemblies are then stacked with successive boxes 42 of filled hoop assemblies engaging the outer ends of hoop extensions 48 of other hoop assemblies. When a predetermined number of these hoop assemblies have been stacked, a gradual pressure is applied thereto to telescope hoop extensions 48 into boxes 42 and the pressure is held until the cheddar cheese blocks set. After they have set, the pressure is removed, the cloth liner is folded over the top of the block and the block is removed from the hoop assembly.

The drive for turntable 10 and the chute guides 52 is provided by a mechanism located within housing 12. This mechanism, see FIG. 7, is in the form of a pneumatically operated rack and pinion drive. More specifically, rack 92 engages gear 94 and is connected to pneumatic cylinder 96. Gear 94 is connected to shaft 55 through a one-way clutch assembly 98. The drive stroke of cylinder 96 is sufficient to rotate gear 94 and correspondingly shaft 55 to step the turntable 10 through approximately 90° of rotation. After the drive step has been taken, cylinder 96 is returned to its initial setting with one-way clutch 98 permitting this motion without disturbing the turntable.

In order to accurately locate the carrier plates 18 in the load and unload stations and also in the fill and press stations, an indexing mechanism (also illustrated in FIG. 7) is provided. This mechanism includes a wheel 100 connected to shaft 55. The wheel includes four indentations 102 spaced at 90° intervals. An indexing roller 104 is supported on a pivot assembly 106 which is connected to a pneumatic cylinder 108. When the turntable has been stepped by cylinder 96 and the rack and pinion associated therewith, cylinder 108 will be operated to drive roller 104 into the adjacent indentation 102. This will accurately locate the turntable and cylinder 108 will remain in the extended position to thereby lock the turntable in that position until the next step is taken whereupon the cylinder 108 is retracted to move roller 104 and release wheel 100.

The connection of chute guides 52 to shaft 55 is provided by drum 110, which is supported on the shaft but has a relatively larger diameter than the shaft, and by means of a four-bar linkage made up of pivotal links 112, which are pivotally connected at one end to brackets attached to drum 110 and at their opposite ends to brackets attached to guide chutes 52. The advantage of using a drum 110 having a larger diameter than shaft 55 is that links 112 can be relatively shorter than would be the case without the drum and, moreover, do not have to extend at an angle from the guide chutes to their point of connection to the shaft.

Vertical movement of the guide chutes is achieved by means of four rollers 114, one each of which is connected to each of the guide chutes by rods 116. For convenience only one roller and its connection has been shown, the remainder being identically connected and arranged. Rollers 114 engage and ride on an annular track 118 mounted in housing 120. FIG. 6 shows a developed view of track 118 with a roller 114 riding on the track. As can be seen in FIG. 6, track 118 has two portions, one offset vertically from the other. Looking at one guide chute assembly, when it is positioned at the load station, its roller 114 will be in engagement on raised portion 120 of the track. As the guide chute and its associated hoop assembly moves from the load station to the fill station, the roller will progress from raised portion 120 toward the lower portion 122 of the track; but for reasons which will be explained does not actually engage the lower track portion at this time. This will allow the guide chute to lower into engagement with the upper edge of hoop assembly extension 48. Roller 114 will remain in above lower portion 122 through the fill and press stations. As the hoop assembly and its associated guide chute move from the press station to the unload station, roller 114 will move up to raised portion 120 clearing the guide chute from the hoop assembly for ease of removal of the hoop assembly from the unit. The downward movement of the guide chutes is achieved by gravity.

Reference will now be had to FIG. 3 which illustrates an interlock assembly at the fill station to prevent discharge of curd through the guide chute if a hoop assembly is not positioned below the hopper 54. This interlock takes the form of a bracket 124 connected to each of the guide chutes. A limit switch 126 is located at the fill station. If the turntable steps and positions a guide chute at the fill station without a hoop assembly below the guide chute, the guide chute will fall to its lower extreme, i.e. roller 114 in engagement with portion 122 of the track, and will actuate limit switch 126 to open the circuit controlling the pneumatic cylinders so that doors 60 and 62 cannot open. If a hoop assembly is located beneath the guide chute, bracket 124 will not come down a sufficient distance to operate the limit switch.

Although but one embodiment of the present invention has been illustrated and described, it will be apparent to those skilled in the art that various changes and modifications may be made therein without departing from the spirit of the invention or from the scope of the appended claims.

We claim:

1. Cheese hoop filling apparatus comprising, in combination,
   a conveyor including a plurality of hoop carrier plates relatively spaced on said conveyor,
   a load station,
   a fill station,
   a press station,
   an unload station,
   means for driving said conveyor to move said carrier plates selectively to said stations,
   means at said load station for moving a hoop onto a carrier plate positioned at said load station,
   means at said unload station for moving a hoop off of a carrier plate positioned at said unload station,
   fill means at said fill station for introducing cheese curd into a hoop positioned at said fill station,
   means at said press station for engaging the curd in a hoop positioned at said press station and compressing said curd into said hoop,
   a plurality of guide chutes, one chute associated with and mounted for joint movement with each of said carrier plates as said carrier plates are moved to said stations,
   and support means supporting said guide chutes above said carrier plates, said support means including means operative to lower said chutes into engagement with the upper edge of a hoop on said carrier plates at said fill and press stations and maintain such engagement at said fill and press stations so that said chutes provide an extension of said hoops at said fill and press stations and further operative to move said chutes away from said carrier plates and space said guide chutes above hoops on the carrier plates at said load and unload stations.

2. The apparatus of claim 1 wherein said fill means includes means for receiving curd and weighing said curd as it is received and operative to discharge a predetermined weight of curd into a hoop.

3. Cheese hoop filling apparatus comprising, in combination,
   means defining a hoop filling station for filling curd into a hoop positioned at said filling station,
   means defining a press station for engaging curd in a hoop positioned at said press station for compressing said curd in said hoop,
   means for moving hoops into and out of said filling and press stations,
   a guide chute,
   means for moving said guide chute jointly with said hoop as said hoop moves from said fill station to said press station, and
   means for moving said guide chute into engagement with the upper edge of a hoop when said hoop is positioned at said fill and press stations, said last mentioned means being further operative to maintain such engagement of said guide chute at said fill and press stations so that said guide chute provides an extension of said hoop at said fill and press stations, thereby permitting said hoop to be overfilled with curd at said fill station.

4. The apparatus of claim 3 wherein said fill means includes means for receiving curd and weighing said curd as it is received and operative to discharge a predetermined weight of curd into a hoop.

5. Cheese hoop filling apparatus comprising, in combination,
   a turntable and plurality of hoop carrier plates relatively spaced on said turntable,
   a load station,
   a fill station,
   a press station,
   an unload station, means for rotating said turntable in a step-by-step manner to move said carrier plates selectively to said stations, fill means at said fill station or introducing cheese curd into a hoop positioned at said fill station, means at said press station for engaging the curd in a hoop positioned at said press station and compressing said curd into said hoop, a plurality of guide chutes connected to and movable with said turntable, one chute associated with and mounted for joint movement with each of said carrier plates as said carrier plates are moved to said stations and also connected for vertical movement relative to said turntable, support means supporting said guide chutes above said carrier plates, said support means including means defining a generally annular track generally co-axial with said turntable and the path of rotation of said guide chutes, said track including portions offset vertically one from the other and said support means further including means connected to said chutes and engaging said track to follow the contour thereof so that said support means is operative to lower said chutes into engagement with hoops on said carrier plates at said fill and press stations and maintain such engagement at said fill and press stations so that said chutes provide an extension of said hoops at said fill and press stations, said support means further operative to move said chutes away from said carrier plates and space said guide chutes above hoops on the carrier plates at said load and unload stations, and conveyor means associated with each of said load and unload stations and including means for moving a hoop onto a carrier plate at said load station and means for moving a hoop off of a carrier plate at said unload station.

6. The apparatus of claim 5 including means for indexing and locking said turntable in position when said hoops have moved to a successive station.

7. The apparatus of claim 6 including
a shaft on which said turntable and guide chutes are mounted,
a drum portion connected to said shaft and having an enlarged diameter relative to said shaft,
and a plurality of pivotal links extending from said drum to said chutes and providing the connection of said chutes to said shaft for rotation with and vertical movement relative to said turntable.

8. The apparatus of claim 5 wherein said press station includes a pad positioned above said turntable and having a shape corresponding generally to the interior of said hoops and also includes means for moving said pad through said guide chute and into said hoop to a point below the upper edge of said hoop.

9. Cheese hoop filling apparatus comprising, in combination, means defining a hoop fill station for filling curd into a hoop positioned at said fill station, means defining a press station for engaging curd in a hoop positioned at said press station and compressing said curd in said hoop, means including a turntable and means for rotating said turntable in a step-by-step manner to move a hoop into and out of said fill and press stations, a guide chute connected to and rotatable with said turntable, and support means including a generally annular track generally co-axial with said turntable and the path of rotation of said guide chute, said track including portions offset vertically one from the other, said support means also including means connected to said guide chute and engaging said track to follow the contour thereof so that support means is operative to lower said guide chute into engagement with a hoop when said hoop is positioned at said fill and press stations and to maintain such engagement at said fill and press stations so that said guide chute provides an extension of said hoop at said fill and press stations.

10. The apparatus of claim 8 wherein said press station includes a pad positioned above said turntable and having a shape corresponding generally to the interior of said hoops and also includes means for moving said pad through said guide chute and into said hoop to a point below the upper edge of said hoop.

* * * * *

PO-1050
(5/69)

UNITED STATES PATENT OFFICE
CERTIFICATE OF CORRECTION

Patent No. 3,805,689      Dated April 23, 1974

Inventor(s) THOMAS C. BERGER and FRED A. LOICHINGER

It is certified that error appears in the above-identified patent and that said Letters Patent are hereby corrected as shown below:

Claim 5 - Column 7, line 4, "or" should be -- for --.

Claim 7 - Column 7, line 41, "6" should be --5--.

Claim 10 - Column 8, line 38, "8" should be --9--.

Signed and sealed this 29th day of October 1974.

(SEAL)
Attest:

McCOY M. GIBSON JR.
Attesting Officer

C. MARSHALL DANN
Commissioner of Patents